(No Model.)
G. R. ODEAN.
BICYCLE WHEEL.
No. 594,211. Patented Nov. 23, 1897.
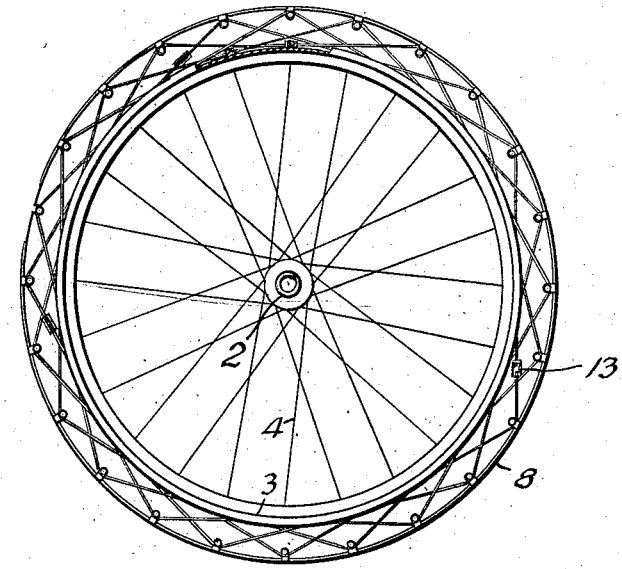
Fig. 1.
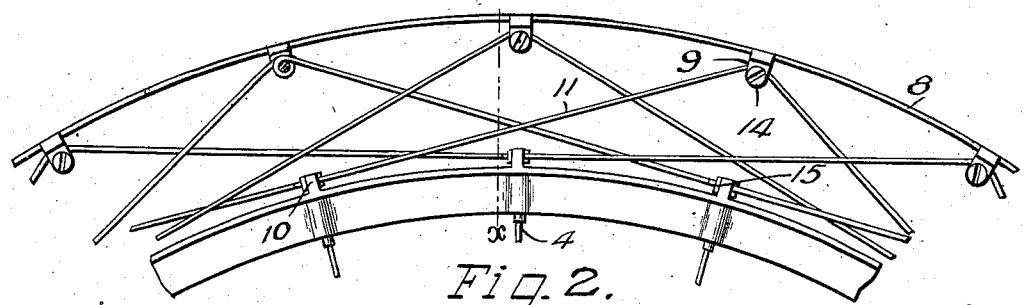
Fig. 2.
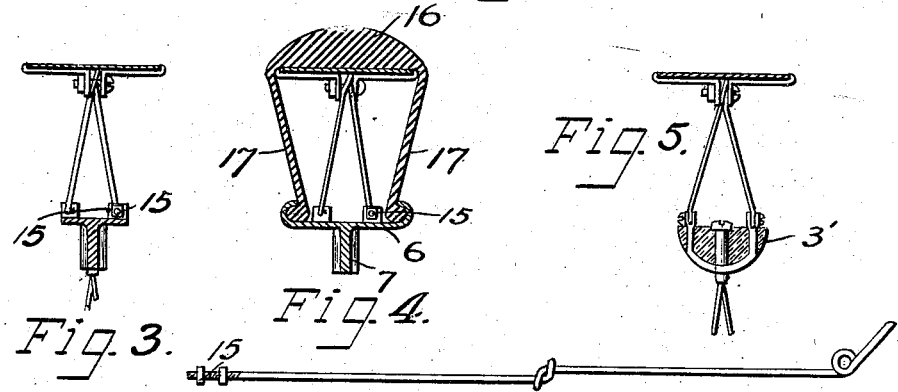
Fig. 3. Fig. 4. Fig. 5.
Fig. 6.
Fig. 7.
Witnesses
J. M. Gooley
Richard Paul
Inventor
Gustavus R. Odean.
By Funk O. Hawley
his attorneys

UNITED STATES PATENT OFFICE.

GUSTAVUS R. ODEAN, OF MINNEAPOLIS, MINNESOTA, ASSIGNOR OF ONE-HALF TO AUGUSTUS E. McCARTY, OF SAME PLACE.

BICYCLE-WHEEL.

SPECIFICATION forming part of Letters Patent No. 594,211, dated November 23, 1897.

Application filed July 6, 1896. Serial No. 598,193. (No model.)

*To all whom it may concern:*

Be it known that I, GUSTAVUS R. ODEAN, of the city of Minneapolis, county of Hennepin, State of Minnesota, have invented certain new and useful Improvements in Bicycle-Wheels, of which the following is a specification.

My invention relates to wheels for bicycles and light vehicles; and the object of the invention is to provide a wheel having a cushion-tire of a non-pneumatic construction, whereby the wheels are adapted to light vehicles and particularly to bicycles.

A further object of the invention is to provide a tire which will resemble the ordinary pneumatic tire both in form and as to the manner of its operation or use, the same having all the needed resiliency or cushion qualities possessed by the present pneumatic tire.

A further and particular object of the invention is to provide a cushion or spring tire wherein but one spring is employed, the same adapted to yield when at the point of contact with the ground, and wherein said spring is held firmly with respect to the rim of the wheel, the strain being equally distributed about the wheel rim and hub, thereby rendering it possible to build a cushion-tire wheel of a weight not exceeding and possibly lighter than the present bicycle-wheels.

My invention consists generally in a wheel comprising the hub, spokes, and rim, in combination with a spring or flexible tire proper, and outwardly inelastic but inwardly collapsible means connecting said tire with the said rim, whereby the tire while held firmly concentric with all other parts of the rim will yield toward the same at the ground-contact point; and, further, my invention consists in particular constructions and combinations of parts, all as hereinafter described, and particularly pointed out in the claims.

The invention will be more readily understood by reference to the accompanying drawings, forming part of this specification, and in which—

Figure 1 illustrates a wheel embodying my invention. Fig. 2 is an enlarged detail of a section of the wheel. Fig. 3 is a sectional view on the line *x x* of Fig. 2. Fig. 4 is a similar section showing a modified form of rim and also showing the outer tire or covering. Fig. 5 shows a modified construction of the rim and the fastening means. Figs. 6 and 7 are detail views of modified ties or stays adapted for employment between the rim and the tire proper.

As shown in the drawings, 2 represents the hub of the wheel and 3 the rim thereof, the two being connected by the spokes 4. This rim may be of any suitable construction, as indicated in Figs. 3, 4, and 5. In Fig. 5 I have shown a rim 3 of wood similar to those now in use. In the other figures I have shown metallic rings, each comprising a ring 6, having the vertical and integral flange or web 7. In the flange or web 7 I provide means for locking and tightening the spokes 4.

8 represents a thin metal tire proper, preferably of spring-steel and of any width desired. This tire proper in itself is very flexible and the ring or hoop is of greater diameter than the rim 3, an annular space of from one to two inches being preferably allowed between the two parts for the connecting-stays. The inner side of the tire proper, 8, is provided with a number of fastenings 9 of any suitable form, and the rim 3 is provided with locks or similar fastenings 10. The ties or stays extend from the fastenings upon the rim to those upon the tire. The ends of the stays are secured in the fastenings of the tire and rim. These stays are inelastic and through the employment of a large number of them it is obvious that a tire will be held concentric with the rim and the hub of the wheel and locked against any movement away from the same, while, as the stays are flexible, any part of the tire may be pressed inward toward the rim, the stays beneath said part collapsing at such time. The stays may be composed of straight wires or cords, of chains, spring-links or sliding links, one form of which is shown in Fig. 6, or of light cables or cords of wire or other material. The ties must be strong enough and of such material as to prevent their being stretched and lengthened by the tension placed thereon, and this, with a degree of flexibility sufficient to allow the collapse of the stays, is the only actual requirement relative to the material to be used in making the same.

The stays are preferably arranged as tangents from the rim, and I preferably employ two or more series of stays to increase the number of tangential connections between the tire and rim and render it possible to use a very light spring-tire 8. Each series of stays may be constituted by a single cord or wire having alternate points of attachment upon the tire and rim and locked to each at such point of attachment. In such cases I prefer to provide means joining the ends of such cord or wire and by which the same may be drawn tightly before the fastenings 9 and 10 are tightened to lock the cord or wire. The fastening and tension device may consist in a small turnbuckle 13. (Shown in Fig. 1.) Providing the continuous cords or wires making up the stays shown in Fig. 1 are all drawn to the same tension, the tightening of the turnbuckles will center the tire with respect to the rim. I believe it is desirable to make the stays of each series of a number of pieces of wire, chain, or cord, making two stays from a single piece of wire, as shown in Fig. 2, and giving the middle of the piece a single wrap about the screw 14 of the tire-fastening, while the ends of the piece are adjustably fastened by the lock-nuts 15 or in any other manner which will admit of tightening of the stays when necessary. The fastenings upon the inside of the tire 8 are preferably all in line one with the other, while those upon the rim are alternated or staggered, so that in cross-section the stays will appear as do the spokes of a wheel when similarly viewed. In this manner the tire is braced or tied against lateral movement with respect to the rim.

With a very strong or stiff tire 8 a single set of stays may be used, but in such a case I prefer to increase the angle of the stays between the rim and tire, so that the points of support upon the tire will be somewhat closer together than shown for opposite fastening-points in Figs. 1 and 2. For a light structure the form shown is preferred.

When pressure is applied to the lower part of the wheel, as by contact with the ground, that portion of the tire lying between the stays which are in a tangential line with one another will spring inward toward the tire, the rest of the tire from one stay-point around the other being meantime held firmly about the rim. As the wheel rolls the yielding point will advance and the stays first collapsed will draw tight again. In better explanation of the device it may be said that the flexible tire is held against outward movement by attachment to the apexes of a series of flexible or collapsible triangles interposed between the tire and the rim, the sides and base of said triangles being inelastic, while as to altitude said triangles are collapsible or flexible to permit the tire to yield inwardly.

To conceal the flat spring strip or tire and also the ties and to prevent sand or mud from getting into the ties, I preferably employ an outer cover or tire, such as that shown in Fig. 4, the same having a thick rubber thread 16 and thin flexible sides 17, the edges of which are fastened upon the rim. For this purpose almost any of the outside tires of the ordinary bicycles may be employed, the rim in each case being suited to the particular tire or tire-covering to be used. In addition to its inward-yielding qualities the tire, being thin and very flexible, will yield or tilt upon the stays to conform to any lateral irregularities of the road or path.

As a driving force will be communicated from the rim to the tire through the tangential stays or ties, my cushion-wheels may be used as the power or drive wheels of bicycles or other vehicles.

Having thus described my invention, I claim as new and desire to secure by Letters Patent—

1. In a wheel the combination of a flexible tire, with an inflexible wheel-rim of smaller diameter than said tire, inelastic but collapsible ties or stays, connecting said tire and rim, and arranged tangentially with respect to said wheel-rim, and whereby said tire is held concentric with the rim except at the point of contact with the ground, substantially as described.

2. The combination, in a wheel, of the rim, with the flexible spring-tire of greater diameter than said rim, lock-fastenings provided upon the tire and rim, the taut stays or ties tangentially arranged with respect to said rim and secured in said fastenings, means for tightening said stays or ties, and said stays or ties being inelastic but flexible, substantially as described.

3. The combination, in a wheel, of the rim, with the tire of greater diameter than said rim, fastenings provided in the middle of the said tire and at the edges of said rim, and ties or stays alternated upon the two sides of the wheel-rim and secured in said fastenings, the said ties or stays acting to stay the tire in a lateral direction, and being inelastic but collapsible, substantially as described.

4. The combination, in a wheel, of the inflexible wheel-rim, with the flexible tire, the tangential ties or stays connecting said rim and tire, two or more sets or series of said ties or stays being employed, whereby the tire is supported at many points, and said ties or stays being collapsible but inelastic, whereby the tire is held concentric with the rim at all points except at the point of contact with the ground, substantially as described.

5. The combination, in a wheel, of the rim, with the flexible tire, the tangential, collapsible and inelastic ties or stays connecting said rim and tire, the flexible tread provided on said tire and the thin flexible sides inclosing the space between the rim and the tire, and fastened upon the rim, substantially as described.

In testimony whereof I have hereunto set my hand this 13th day of June, A. D. 1896.

GUSTAVUS R. ODEAN.

In presence of—
C. G. HAWLEY,
M. E. GOOLEY.